Patented Aug. 16, 1932

1,871,850

UNITED STATES PATENT OFFICE

WINFRID HENTRICH, OF LEVERKUSEN-WIESDORF, ERNST TIETZE, OF COLOGNE-RHINE, ANTON OSSENBECK, OF COLOGNE-MULHEIM, AND PETER BACKES, OF GLADBACH-RHEYDT, GERMANY, ASSIGNORS TO GENERAL ANILINE WORKS, INC., OF NEW YORK, N. Y., A CORPORATION OF DELAWARE

NEW DIAZO-AMINO COMPOUNDS

No Drawing. Application filed September 17, 1931, Serial No. 563,458, and in Germany July 14, 1928.

The present invention relates to new diazo-amino compounds, more particularly it relates to compounds of the probable general formula:

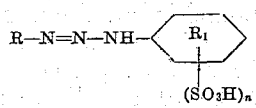

wherein R stands for the radical of a diazotizable amine suitable for producing azodyestuffs which is at least once substituted by a substituent selected from the group consisting of the sulfonic acid group, the carboxylic acid group, a carboxylic acid ester group, the aryl-sulfone group, the nitro group and halogen, and which may be further substituted by alkyl or alkoxy, $n$ stands for one of the numbers one to three, and wherein the benzene nucleus $R_1$ may be further substituted by substituents of the group consisting of alkyl, alkoxy, halogen.

Our new compounds are obtainable by causing to react upon each other, advantageously in about molecular quantities and at a low temperature, say at temperatures not higher than about 30–40° C., a diazonium compound obtained in the usual manner from a primary aromatic amine suitable for producing azodyestuffs and being at least once substituted in the nucleus in the kind referred to above and an amino-benzene sulfonic acid containing one to three sulfonic acid groups.

As diazo-compounds suitable for the purpose of the invention there may be enumerated by way of example nitrodiazobenzene, nitrodiazotoluene, dinitrodiazobenzene, polyhalogenbenzene, aminodiarylsulfones, and the like.

In carrying out the invention we prepare a diazo solution in the usual manner by diazotizing the aromatic amine with sodium nitrite and hydrochloric acid and introduce the same into an aqueous solution of an aminobenzene mono-, di- or tri-sulfonic acid. The formation of the new diazoamino compounds proceeds extremely smoothly either in alkaline, neutral and weakly acid aqueous solution. From the concentrated solutions the new diazoamino compounds often partially separate during the reaction, especially when working in acid solution. The separation can be completed by the addition of a suitable salt, such as common salt. After carefully drying, the new products are generally obtained in form of greyish to orange crystalline powders. The action of acid reagents, such as formic acid, acetic acid, oxalic acid and sodium bisulfate, on the aqueous solutions of the salt of the new diazoamino compounds causes in a very short time a smooth and quantitive reconversion into the diazo compound and the aminobenzene sulfonic acid used in the formation of the diazoamino compound. Furthermore, the new products are stable towards heat, percussion, friction and neutral and alkaline substances, such as Glauber's salt, sodium carbonate, potassium carbonate and the like.

The new compounds are intended to find application in dyeing and printing and also for combating insect pests.

The following examples will illustrate our invention, without limiting it thereto:

Example 1.—24,3 parts by weight of 2.5-dichloro-1-aminobenzene-4-sulfonic acid are diazotized in the usual manner, and the diazo solution is slowly run into the solution of 36 parts by weight of aniline-2.5-disulfonic acid. The reaction mixture is neutralized by the addition of sodium acetate until neutral to Congo, and the new diazo-amino compound having in the free state the following formula:

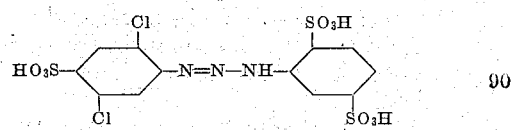

is salted out, sucked off, centrifuged and dried by gently heating.

Instead of 2.5-dichloro-1-aminobenzene-4-sulfonic acid there can be used 2-amino-4′-methyl-1.1′-diphenylsulfone-4-sulfonic acid or 2-amino-4′-hydroxy-1.1′-diphenylsulfone-3′-carboxylic acid-4-sulfonic acid or the 2-amino-1.1′-diphenylsulfone itself.

*Example 2.*—152 parts by weight of 5-nitro-2-amino-1-methylbenzene are diazotized in the usual manner in hydrochloric acid solution in sodium nitrite. The filterd diazo solution is quickly introduced at about 20° C. in the neutral solution of the sodium salt of 360 parts by weight of technical aniline-2.5-disulfonic acid in 1000 parts of water. The acid reaction of the solution is then neutralized with sodium acetate until neutral to Congo, and the reaction product is salted out by the addition of common salt. The diazoamino compound, having in its free state the following formula:

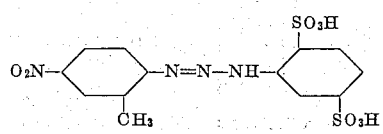

is sucked off after some time, centrifuged and dried at a moderate temperature. It is a yellowish orange crystalline powder, easily soluble in water, stable towards heat, percussion and friction. By the action of weak and strong acids or acid reacting salts it is split up into its components quickly and quantitatively.

In quite an analogous manner there is obtainable a diazo-amino compound of similar properties when the diazonium chloride solution above described is caused to react upon the sodium salt of aniline-2.4-disulfonic acid in aqueous solution.

*Example 3.*—152 parts by weight of 3-nitro-1-methyl-4-aminobenzene are diazotized in the usual manner. This solution is slowly introduced at about 20° C. into a neutral solution of rather more than the calculated quantity of aniline-2.5-disulfonic acid. The solution is neutralized by the addition of sodium acetate, and the new compound is separated by the addition of common salt. The compound, having in its free state the following formula:

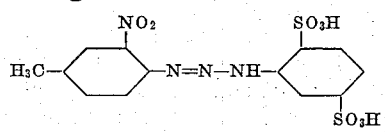

crystallizing in glittering yellow leaflets, is sucked off, centrifuged and dried at about 60° C. It is very soluble in water and is split up even by weak acids quantitatively into the two starting components. The yield is theoretical.

In an analogous manner there are obtainable from the diazo compound from 2.4-dichloro-aniline with aniline-2.5-disulfonic acid or aniline-3.5-disulfonic acid diazoamino compounds having similar properties.

*Example 4.*—Into the aqueous solution of the diazonium chloride prepared from 183 parts by weight of 2.4-dinitroaniline, said aqueous solution containing sodium acetate, there is introduced a neutral solution of the sodium salt of rather more than the calculated quantity of aniline-2.5-disulfonic acid. When the coupling is complete, there is obtained in a rather quantitative yield the sodium salt of the diazoamino compound of the formula:

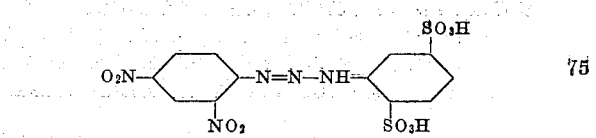

The compound is very stable.

*Example 5.*—162 parts by weight of 2.5-dichloroaniline are diazotized in the usual manner. The diazo solution is slowly introduced into a neutral solution of an equivalent quantity of aniline-3.5-disulfonic acid. When the coupling is complete, the diazoamino compound is salted out from the solution which previously has been neutralized by the addition of sodium acetate. It is obtained in form of a yellowish powder of good stability and solubility. Yield nearly quantitative.

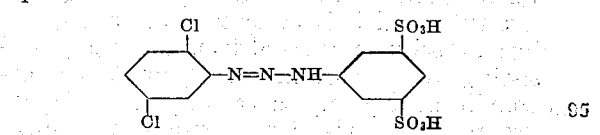

*Example 6.*—137 parts by weight of 4-aminobenzoic acid are diazotized in the usual manner. The diazo solution is slowly introduced, while stirring, into a solution containing 140 parts by weight of crystallized sodium acetate and 209 parts by weight of the sodium salt of 1-methyl-2-aminobenzene-5-sulfonic acid. When the coupling is complete, the reaction liquid rendered alkaline by the addition of soda solution, is salted out by means of sodium chloride, filtered and dried. There are obtained yellow, water soluble leaflets. In its free state the compound has the following formula:

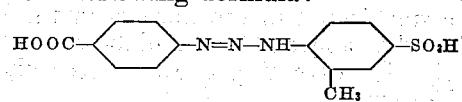

*Example 7.*—233 parts by weight of 2-aminodiphenylsulfone are dissolved in the equivalent quantity of acetone. This solution is added to 400 parts by weight of ice-cold technical hydrochloric acid and quickly diazotized with an aqueous solution of 69 parts by weight of sodium nitrite. While stirring, this diazo solution is introduced into a solution of 325 parts by weight of the sodium salt of 1-methoxy-2-aminobenzene-4.6-disulfonic acid. When the coupling is complete, the diazoamino compound is salted out from the solution which previously has been neutralized by the addition of sodium acetate. The working up is effected in quite an analogous manner as described in Example 6. In its free state the compound corresponds to the following formula:

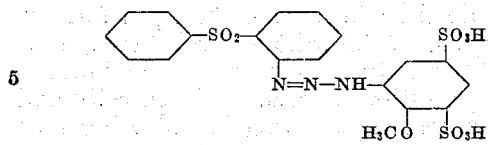

*Example 8.*—185,5 parts by weight of 2-amino-5-chloro-1-benzoic acid - methylester are diazotized in the usual manner. The diazo solution is neutralized by the addition of sodium acetate, to the solution there are added 329,5 parts by weight of 1-amino-4-chlorobenzene - 2.5 - disodiumsulfonate, dissolved in water. The coupling enters immediately, and the diazo compound having in its free state the following formula:

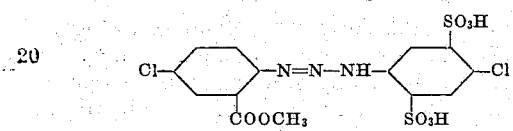

is salted out from the solution, rendered sodaalkaline, filtered and dried.

*Example 9.*—196 parts by weight of 2-amino-4-methyl-5-nitro-1-benzoic acid are diazotized in the usual manner with 69 parts by weight of sodium nitrite and, as described in Example 6, coupled with 209 parts by weight of the sodium salt of 1-methyl-2-aminobenzene-5-sulfonic acid. The diazoamino compound thus obtained, having in its free state the following formula:

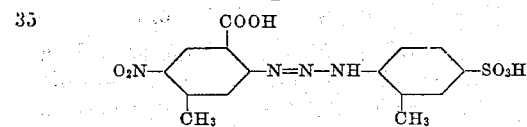

is separated as described in Example 6.

*Example 10.*—158 parts by weight of 5-nitro-2-amino-1-methoxybenzene are diazotized in the usual manner with 69 parts by weight of sodium nitrite. The diazo solution is neutralized by the addition of sodium acetate and to the solution there are added 329,5 parts by weight of the sodium salt of 1-amino-4-chlorobenzene-2.5-disulfonic acid. The coupling enters immediately, and by salting out by means of sodium chloride the diazoamino compound is obtained in form of yellow, easily water soluble leaflets. In its free state the compound corresponds to the following formula:

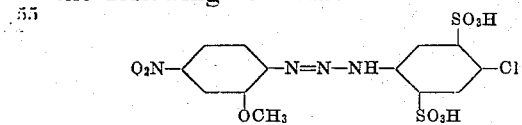

*Example 11.*—188 parts by weight of 4-nitro-1-naphthylamine are diazotized in the usual manner with 69 parts by weight of sodium nitrite, and the diazo solution is caused to react upon 331,5 parts by weight of the sodium salt of 4-chloroaniline-2.5-disulfonic acid in the presence of an acid-binding agent. When the coupling is complete, the sodium salt of the diazoamino compound formed, having in its free state the following formula:

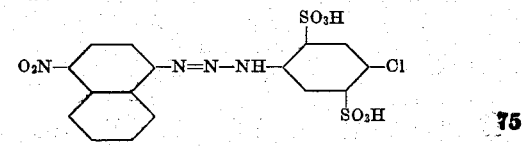

is salted out by the addition of sodium chloride.

*Example 12.*—214 parts by weight of 4'-nitro-4-aminodiphenyl are diazotized in a hydrochloric acid solution with 69 parts by weight of sodium nitrite. The diazo solution is neutralized by the addition of sodium acetate, and to the solution there are added 311 parts by weight of the sodium salt of 2-amino-1-methylbenzene-3.5-disulfonic acid. When the diazo salt has disappeared, the sodium salt of the diazoamino compound, having in its free state the following formula:

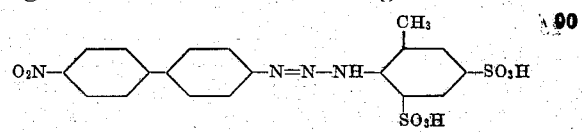

is separated by the addition of common salt.

*Example 13.*—On replacing in Example 11 188 parts by weight of 4-nitro-1-naphthylamine by 293 parts by weight of the sodium salt of 1-aminoanthrachinone-2-sulfonic acid and proceeding in the same manner as described in Example 11, the sodium salt of the diazoamino compound, having in its free state the following formula:

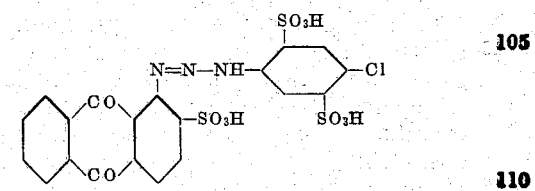

is obtained.

*Example 14.*—227 parts by weight of 4-nitro-3-amino-carbazole are diazotized in a hydrochloric acid solution with 69 parts by weight of sodium nitrite. The diazo solution is neutralized by the addition of sodium acetate, and 331,5 parts by weight of the sodium salt of 4-chloroaniline-2.5-disulfonic acid are added thereto. When the coupling is complete, from the diazo solution, rendered soda-alkaline, the sodium salt of the diazoamino compound, having in its free state the following formula:

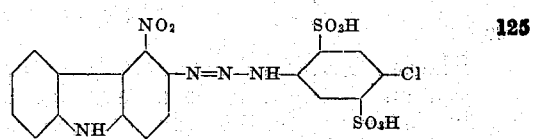

is separated in the usual manner.

This in a continuation-in-part of our application Ser. No. 377,075, filed July 9, 1929.

We claim:

1. As new products diazoamino compounds of the probable general formula:

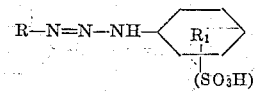

wherein R stands for the radical of a diazotizable amine suitable for producing azodyestuffs which is at least once substituted by a substituent selected from the group consisting of the sulfonic acid group, the carboxylic acid group, a carboxylic acid ester group, the arylsulfone group, the nitro group and halogen, and which may be further substituted by alkyl or alkoxy, $n$ stands for one of the numbers one to three, and wherein the benzene nucleus $R_1$ may be further substituted by substituents of the group consisting of alkyl, alkoxy and halogen, being in form of their alkali metal salts generally greyish to orange crystalline powders, stable towards heat, percussion, friction and neutrally and alkaline reacting substances and being split up in aqueous solution into the two starting components by the addition of acid reacting agents.

2. As new products diazoamino compounds of the probable general formula:

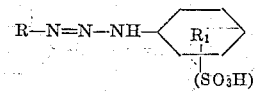

wherein R stands for a benzene nucleus which is at least once substituted by a substituent selected from the group consisting of the sulfonic acid group, the carboxylic acid group, a carboxylic acid ester group, the arylsulfone group, the nitro group and halogen, and which may be further substituted by alkyl or alkoxy, $n$ stands for one of the numbers one to three, and wherein the benzene nucleus $R_1$ may be further substituted by substituents of the group consisting of alkyl, alkoxy and halogen, being in form of their alkali metal salts generally greyish to orange crystalline powders, stable towards heat, percussion, friction and neutrally and alkaline reacting substances, and being split up in aqueous solution into the two starting components by the addition of acid reacting agents.

3. As new products diazoamino compounds of the probable general formula:

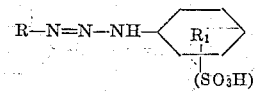

wherein $x$ stands for a nitro group or halogen, and wherein the benzene nucleus R may be further substituted by halogen, a nitro group, alkyl or alkoxy, $n$ stands for one of the numbers one to three, and wherein the benzene nucleus $R_1$ may be further substituted by substituents of the group consisting of alkyl, alkoxy and halogen, being in form of their alkali metal salts generally greyish to orange crystalline powders, stable towards heat, percussion, friction and neutrally and alkaline reacting substances, and being split up in aqueous solution into the two starting components by the addition of acid reacting agents.

4. As new products diazoamino compounds of the probable general formula:

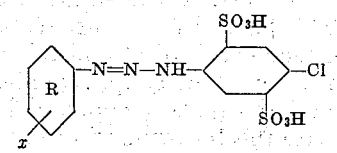

wherein $x$ stands for a nitro group or halogen, and wherein the benzene nucleus R may be further substituted by halogen, a nitro group, alkyl or alkoxy, being in form of their alkali metal salts generally greyish to orange crystalline powders, stable towards heat, percussion, friction and neutrally and alkaline reacting substances, and being split up in aqueous solution into the two starting components by the addition of acid reacting agents.

5. As a new product the diazoamino compound of the following formula:

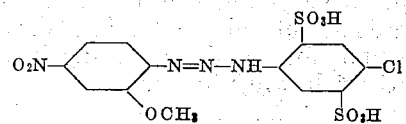

being in the form of its alkali metal salts a yellowish, crystalline powder, easily soluble in water, stable towards heat, percussion, friction and neutrally and alkaline reacting substances, and being split up in aqueous solution into the two starting components by the addition of acid reacting agents.

In testimony whereof, we affix our signatures.

WINFRID HENTRICH.
ERNST TIETZE.
ANTON OSSENBECK.
PETER BACKES.